United States Patent [19]
Willis

[11] Patent Number: 5,975,802
[45] Date of Patent: Nov. 2, 1999

[54] PIPELINE LAYING APPARATUS

[75] Inventor: Stewart K. Willis, Banchory, United Kingdom

[73] Assignee: Stolt Comex Seaway, Ltd., United Kingdom

[21] Appl. No.: 08/922,692

[22] Filed: Sep. 2, 1997

Related U.S. Application Data

[63] Continuation-in-part of application No. 08/585,661, Jan. 16, 1996, abandoned.

[30] Foreign Application Priority Data

Jan. 13, 1995 [GB] United Kingdom .................. 9500664

[51] Int. Cl.$^6$ ....................................................... F16L 1/12
[52] U.S. Cl. ........................ 405/166; 405/168.1; 405/169; 405/170
[58] Field of Search ..................... 405/168, 168.1–168.4, 405/169, 166, 170, 171

[56] References Cited

U.S. PATENT DOCUMENTS

| | | | |
|---|---|---|---|
| 3,630,461 | 12/1971 | Sagasti | 405/168.3 |
| 3,685,306 | 8/1972 | Mott | 405/168.3 |
| 4,269,540 | 5/1981 | Uyeda et al. | 405/168 |
| 4,345,855 | 8/1982 | Uyeda et al. | 405/168 |
| 4,647,253 | 3/1987 | Jacobson et al. | 405/168.1 |
| 4,789,108 | 12/1988 | Recalde | 405/166 X |
| 4,992,001 | 2/1991 | Harrison | 405/166 |
| 5,011,333 | 4/1991 | Lanan | 405/168.1 X |
| 5,413,434 | 5/1995 | Stenfert et al. | 405/168.1 |
| 5,573,353 | 11/1996 | Racalde | 405/168.3 |
| 5,580,187 | 12/1996 | Jordon | 405/168.3 |

FOREIGN PATENT DOCUMENTS

| | | |
|---|---|---|
| 81201357 | 6/1982 | European Pat. Off. . |
| 0 320 038A1 | 11/1988 | European Pat. Off. . |
| 1414695 | 11/1975 | United Kingdom . |
| 2 025 566 | 1/1980 | United Kingdom . |
| 2 275 753 | 7/1994 | United Kingdom . |
| 2 287 518 | 9/1995 | United Kingdom . |
| WO 95/25237 | 9/1995 | WIPO . |
| WO 95/25238 | 9/1995 | WIPO . |

OTHER PUBLICATIONS

Martin, et al., International Publication No. WO 95/25237, Sep. 21, 1995.

*Primary Examiner*—Dennis L. Taylor
*Attorney, Agent, or Firm*—Fields and Johnson, P.C.

[57] ABSTRACT

A subsea pipe laying system is mounted on a ship and comprises a fabrication station where lengths of pipe are welded together to form a pipeline. The pipeline is then guided to a pipe laying zone where including a straightener under the control of a tensioner/clamping arrangement the pipeline is straightened and laid on the sea bed. The straightener and the tensioner/clamps are mounted on a ramp which can be tilted whereas the fabrication zone is on the deck of the vessel. The pipeline can either be fabricated in a forward direction and then have its direction and movement reversed to lay over the stern or be fabricated in an aft direction and laid over the stern.

28 Claims, 7 Drawing Sheets

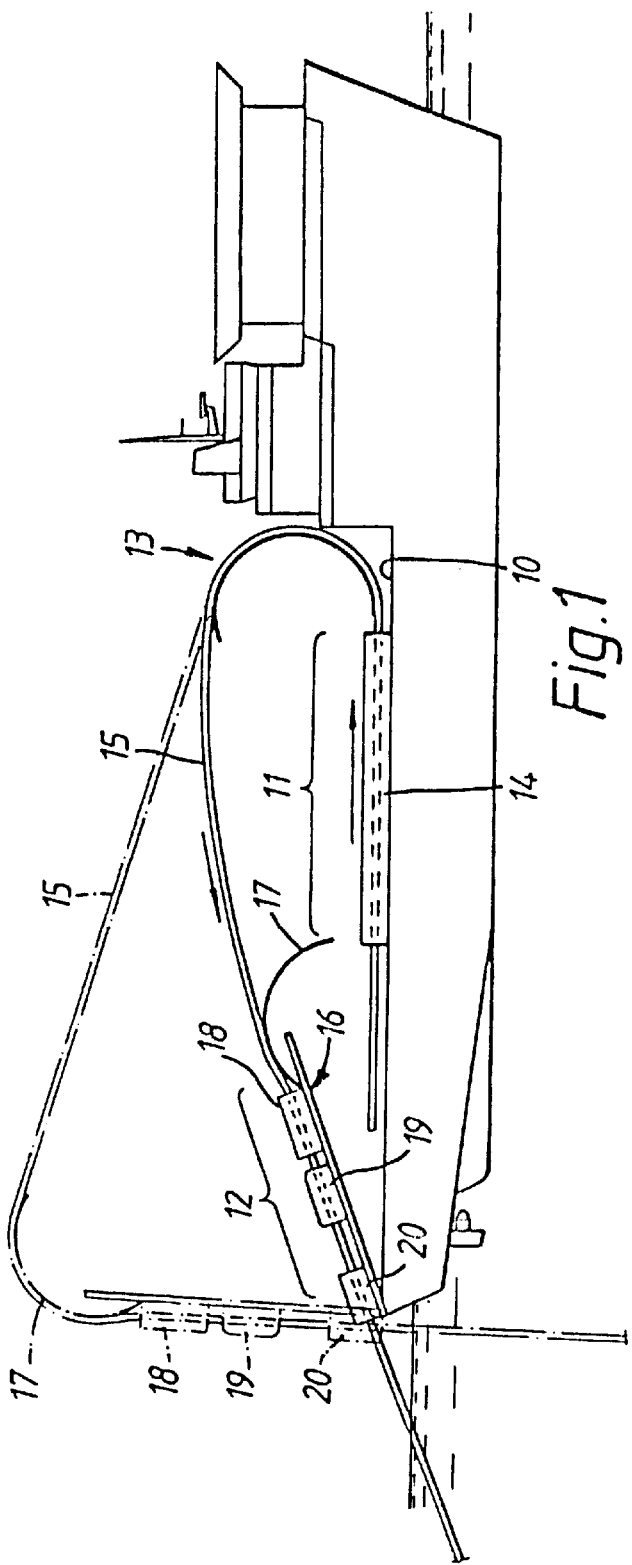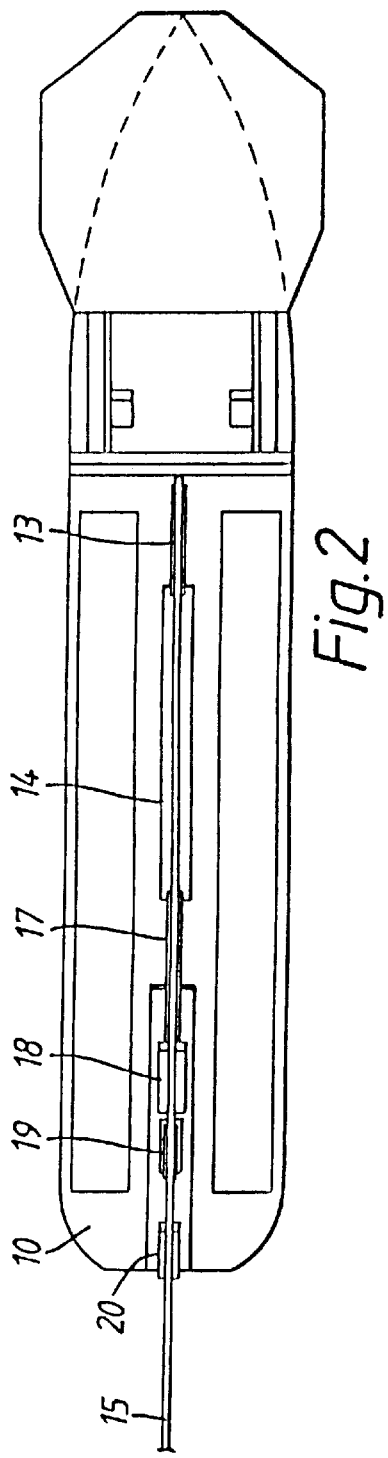

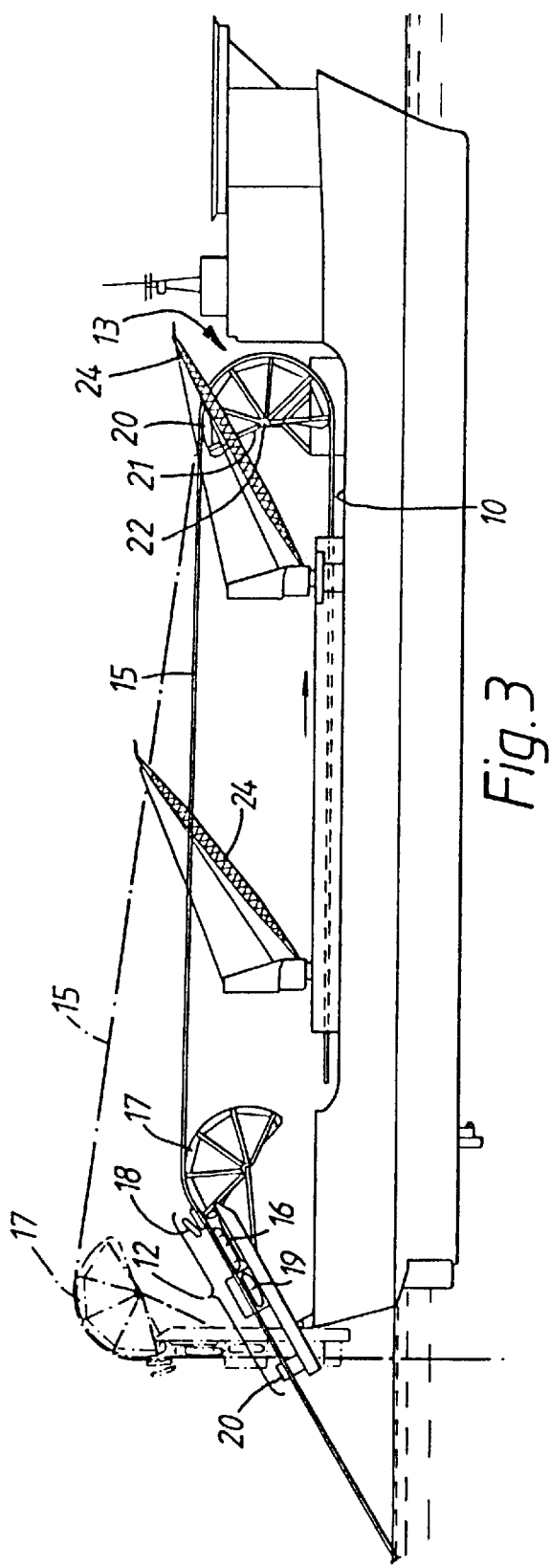
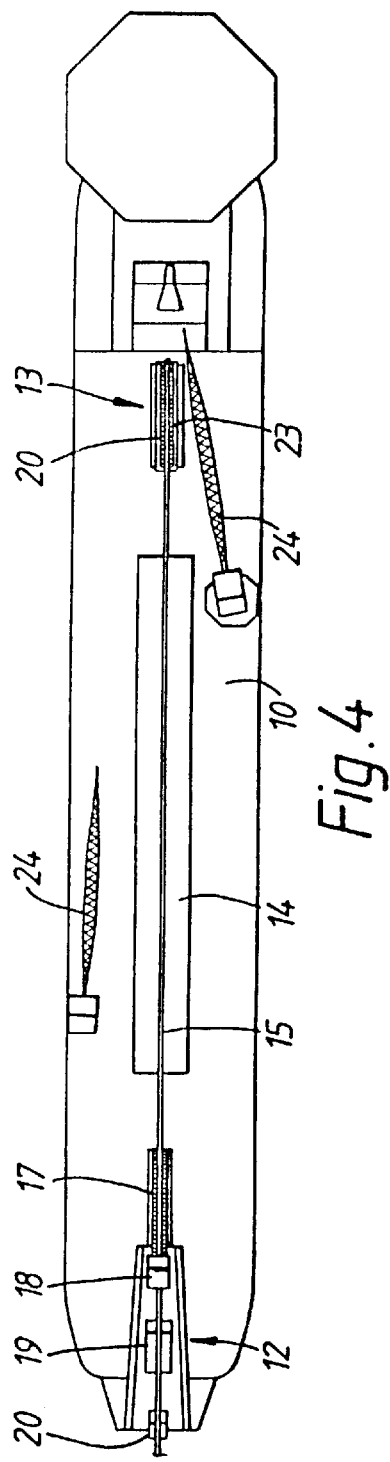

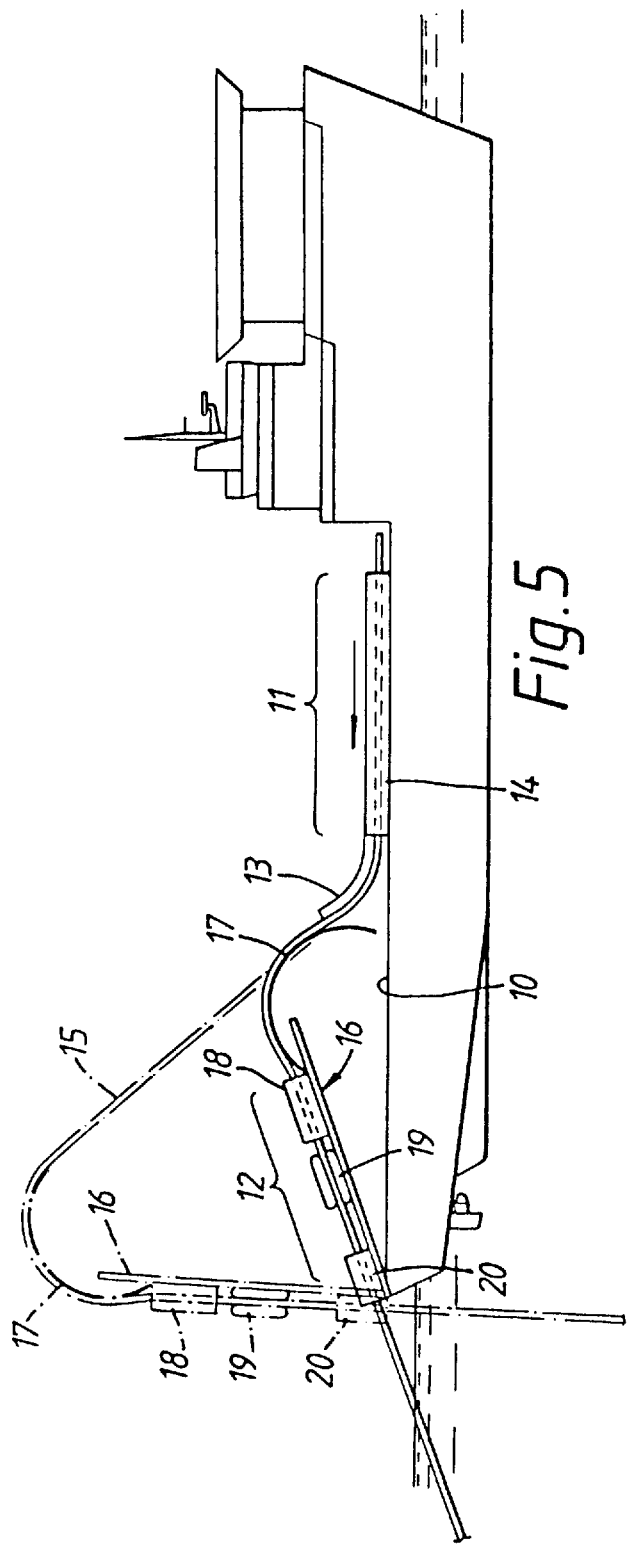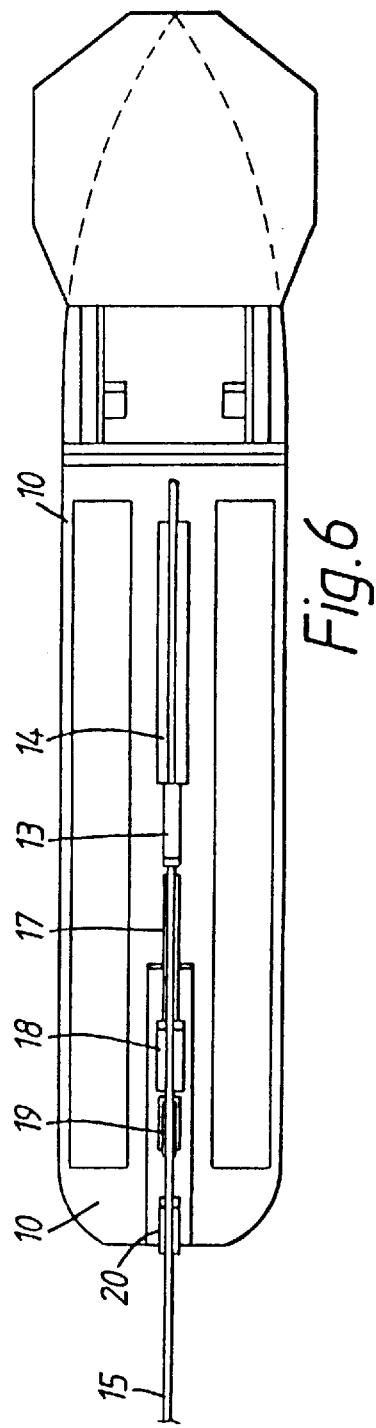

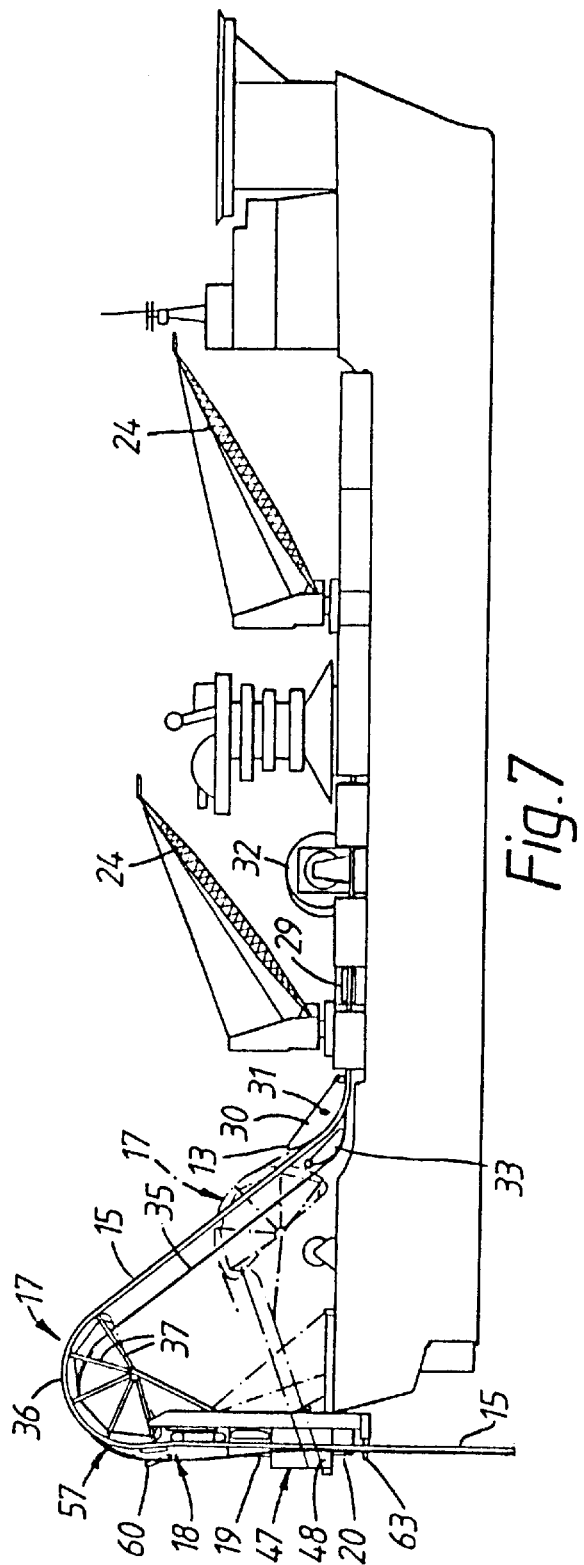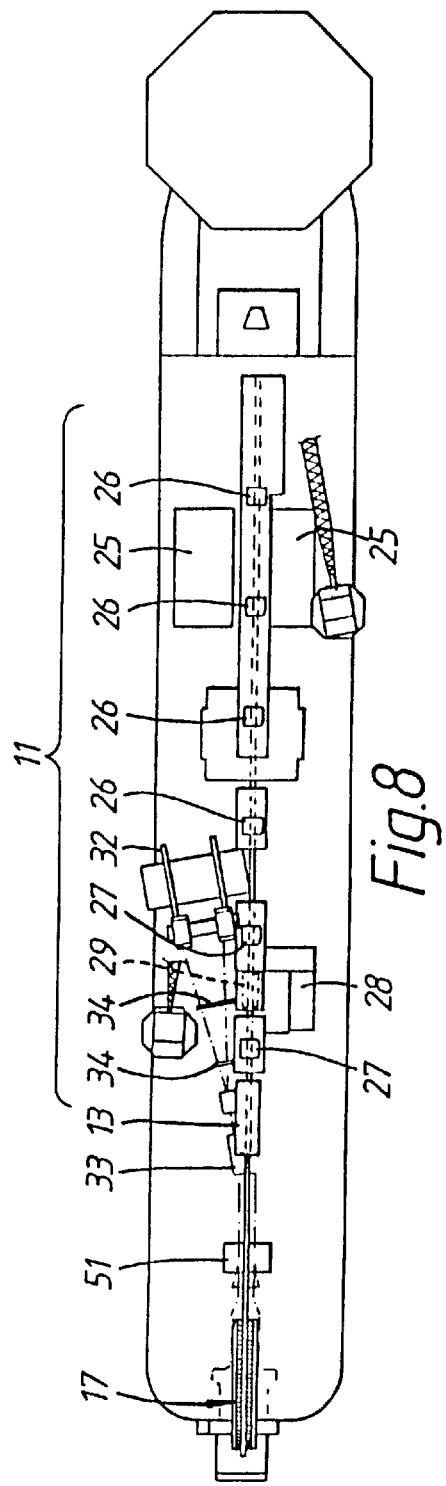

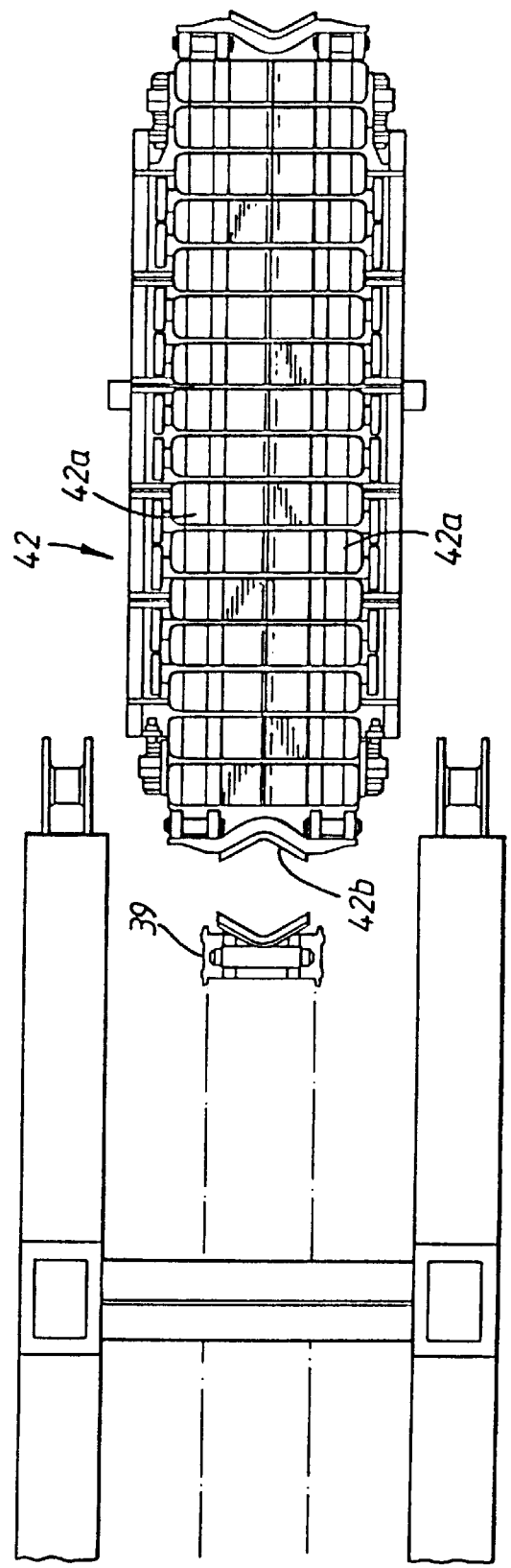

_5,975,802_

PIPELINE LAYING APPARATUS

This application is a continuation in part of U.S. application Ser. No. 08/585,661 filed Jan. 16, 1996, and entitled "Pipeline Laying" now abandoned.

BACKGROUND

1. Field of the Invention

The invention relates to pipeline laying and more particularly to the laying of a pipeline on the sea bed.

2. Brief Review of the Prior Art

It has been proposed previously to lay a pipeline on the sea bed either by unwinding the pipeline from a reel carried on a vessel or by welding lengths of pipe on the vessel to form the pipeline and then laying the pipeline on the sea bed. The use of a reel requires a comparatively low tension in the pipeline so reducing the thrust requirements of the vessel. This allows the pipeline to be laid in very deep water. This method is, however, limited by the capacity of the reel, which may, for example, be 20 km of 305 mm (12 inch) pipe. In order to obtain further pipeline for laying, the vessel must travel to one of the scarce dedicated bases for the fabrication of pipeline, moor and take onto the reel a fresh length of pipeline.

The welding of a pipeline from lengths of pipe has been achieved in two different ways. In one way, the pipeline is fabricated on the vessel and then bent elastically over a stern structure commonly known as a stinger before being allowed to assume the natural catenary between the vessel and the sea bed. This requires very high tensions to be maintained in the pipeline and consequently very high thrust from the vessel, in order to avoid buckling of the pipeline at the end of the stinger as it is laid overboard. Even the most modern of vessels can only lay pipeline to a depth of 600 metres by this method but it has the advantage that the vessel can be re-supplied with pipe lengths while laying the pipeline so that the length of pipeline that can be laid in a stretch is almost limitless.

An alternative is to prefabricate a number of pipe lengths (say three or more) into a pipe stalk which is then loaded into a generally horizontal ramp extending along the vessel and pivoted about the stern of the vessel. By tilting the ramp the pipe stalk may then be aligned with a separate ramp, also pivoted about the stern, which is adjustably fixed at the angle of the top end of the pipe catenary. The pipe stalk is then welded to the pipeline and passed over the stern. In this method there is no bending of the pipe either at the top end of the catenary, or on board the vessel, but the ramp must be more than 150 m long in order to accommodate sufficiently long pipe stalks to achieve sensible lay rates.

SUMMARY OF THE INVENTION

According to the invention, there is provided a pipeline laying vessel comprising a deck, a store for lengths of pipe, means on said deck for connecting lengths of pipe to form a continuous pipeline, a ramp which can be tilted about a horizontal axis normal to the direction of pipeline laying and having an upper end spaced above said deck, and a lower end, a pipeline directing means for receiving pipeline from said connecting means and for directing the pipeline to said upper end of said ramp by plastically bending the pipeline, a pipeline straightener on said ramp for receiving pipeline from said directing means and removing the curvature imparted by said directing means, means on the ramp for receiving pipeline from said straightener and for holding the weight of the pipeline during laying and for controlling paying out of the pipeline, a clamp for holding the weight of the pipeline while work is done upon the pipeline.

In this way, the pipeline can be assembled on board a floating platform and then laid on the sea bed.

The following is a more detailed description of two embodiments of the invention, by way of example, reference being made to the accompanying drawings in which:

BRIEF DESCRIPTION OF THE DRAWINGS

FIG. 1 is a schematic side elevation of a ship carrying a first form of pipe laying system including a fabrication zone, a pipe laying zone and pipe directing means, FIG. 2 is a plan view from above of the vessel of FIG. 1 carrying the first form of the system, FIG. 3 is a side elevation of a ship carrying a modified arrangement of the first form of pipe laying system, FIG. 4 is a plan view of the ship of FIG. 3, FIG. 5 is a similar view to FIG. 1 but showing the ship carrying a second form of pipe laying system with a fabrication zone, a pipe laying zone and pipe directing means, and FIG. 6 is a plan view from above of the ship of FIG. 3.

FIG. 7 is a side elevation of a ship carrying a modified arrangement of the second form of pipe laying system, FIG. 8 is a plan view of the ship of FIG. 7, FIG. 11 is an elevation of a roller loop which co-operates with a radius controller of the modified arrangement of FIGS. 7 to 10 to apply reverse curvature to the pipeline.

DESCRIPTION OF THE PREFERRED EMBODIMENTS

Figure 9:
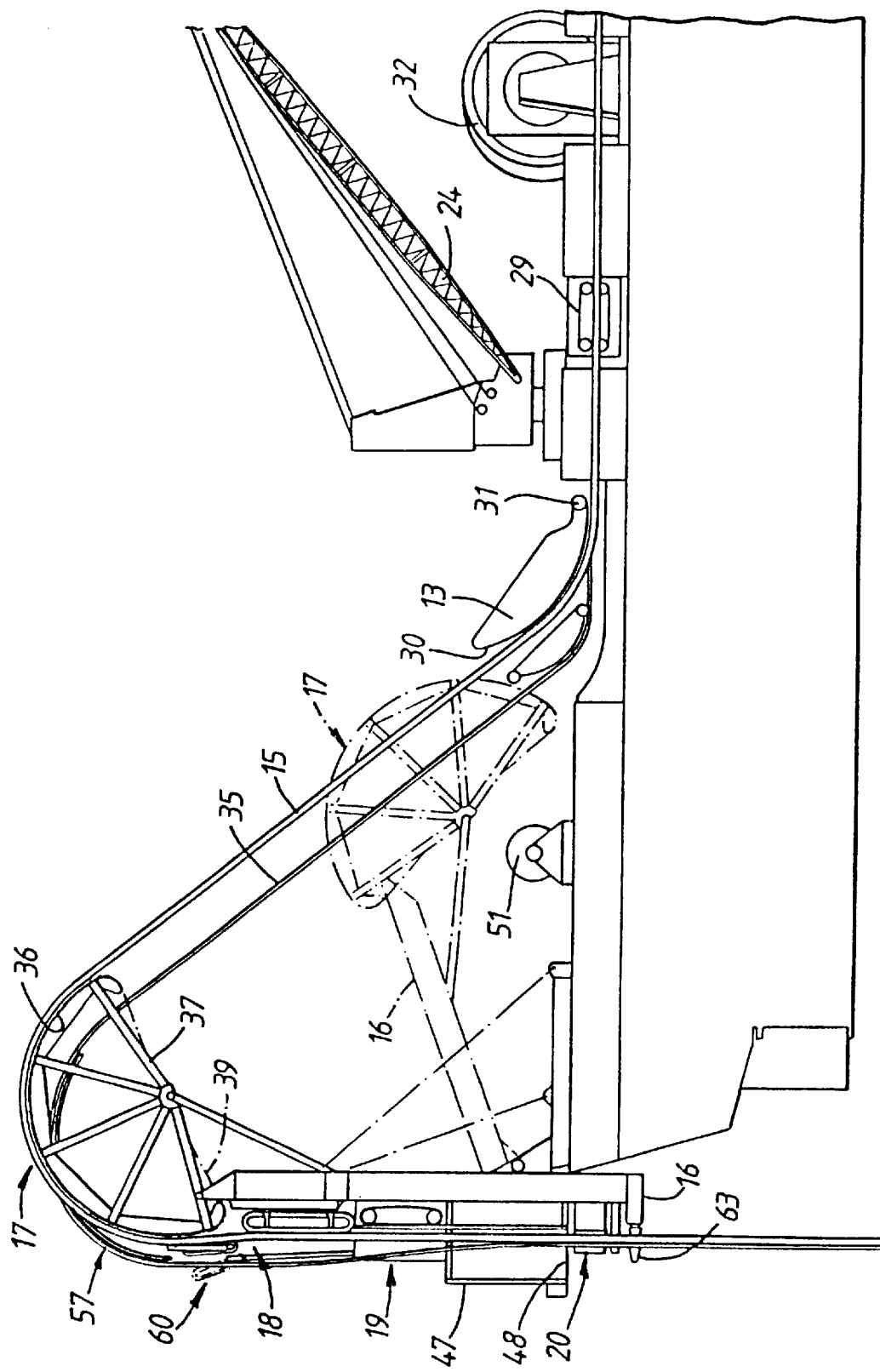
FIG. 9 is a side elevation of a stern section of the ship of FIGS. 7 and 8.

Referring first to FIGS. 1 and 2, the ship is provided with a rear deck 10 carrying the first form of pipe laying system. The system comprises a fabrication zone 11, a pipe laying zone 12 and a pipe directing device 13 between the fabrication zone 11 and the pipe laying zone 12.

The fabrication zone 11 includes a platform 14 at which lengths of pipe can be welded together in end-to-end abutting relationship to form a pipeline 15. The fabrication zone 11, the pipe laying zone 12 and the pipe directing device 13 are, as best seen in FIG. 2, arranged along the centre line of the ship and this leaves areas on the deck 10 to either side of the fabrication zone 11 for the storage of pipes which can be passed to the fabrication zone 11 to be welded into the pipeline 15.

As seen in FIG. 1, the fabrication zone 11 is arranged so that the pipeline 15 is formed in a forward direction; i.e. towards the bow of the ship. The pipe directing device 13 is provided at the forward end of the platform and comprises a roller track or chute which guides the pipeline 15 in such a path as to reverse its direction of movement so that, as the pipeline 15 leaves the pipe directing device 13 it is travelling towards the stern of the ship. The device 13 controls the bend radius of the pipeline 15 during plastic bending and prevents excessive ovalisation or buckling of the pipeline.

The pipe laying zone 12 comprises a straight ramp 16 whose length lies in a vertical plane including the length of the ship and which is mounted on the stern of the ship for pivotal movement about a horizontal axis. The ramp 16 thus overlies the deck 10.

The ramp 16 carries a ramp radius controller 17 which guides the pipeline 15 while ensuring that the pipeline 15 is not excessively ovalised or buckled while being bent. The pipeline 15 passes to a pipe straightener 18 also carried on the ramp 16 which removes bend imparted to the pipeline 15 by the pipe directing device 13 and the ramp radius controller 17. The pipe straightener 18 is followed on the ramp 16 by a tensioner or movable clamp 19. This is followed by a fixed clamp 20.

In use, lengths of pipe are taken from the store and welded together on the platform 14 to form the pipeline 15. The pipeline 15 then passes around the pipe directing device 13 where the pipeline 15 is bent plastically. It is then guided by the radius controller 17 into the pipe straightener 18 which applies reverse plastic bending to the pipeline 15. The radius controller 17 also ensures that the pipeline is bent plastically without excessive ovalisation or buckling. The pipeline 15 then passes from the end of the ramp 16 on to the sea bed.

The ramp 16 can be tilted as required by the conditions such as the water depth in the zone in which the pipeline 15 is to be laid and the characteristics of the pipe such as diameter strength and weight. In deeper water it will be generally vertical whereas in shallower water it will be inclined.

In this way, there is no need to provide a reel on the ship; the pipes to form the pipeline 15 can be simply stored on the deck and fabricated into a pipeline as needed. It will be appreciated that, since the pipeline 15 is laid on to the sea bed from a vertical disposition in deep water, the drag on the ship caused by the pipeline 15 is minimal. Rather, the weight of the pipeline represents only a vertical weight hanging from the stern of the ship. Thus, the ship does not need significant extra power when laying the pipeline and this can allow the pipeline 15 to be laid at increased depths (2000 m or more).

Referring next to FIGS. 3 and 4, parts common to this arrangement and to the arrangement of FIGS. 1 and 2 are not described in detail and will be given the same reference numerals.

In this modification, the pipe directing device 13 is formed by an arcuate track 20 positioned by a plurality of radial supports 21 on a mounting 22. The surface of the track 20 is, as best seen in FIG. 4, provided with a plurality of side-by-side rollers 23 having respective axes extending parallel to the axis of the track 20. Thus, as the pipeline 15 passes around the pipe-directing device 13, the rollers 23 rotate to reduce the frictional forces between the pipeline 15 and the device 13.

A pair of cranes 24 are provided for bringing lengths of pipe to the platform 14 and for loading lengths of pipe on to the ship.

The pipe-laying zone 12 will be described in greater detail below with reference to FIGS. 9 and 10.

The second form of pipe laying system is shown in FIGS. 5 and 6. Parts common to this embodiment and to the embodiment of FIGS. 1 to 4 are not described in detail and will be given the same reference numerals.

In this embodiment, the direction of fabrication of the pipeline is reversed with the platform 14 being moved forwardly on the deck 10 so that, as the pipeline 16 is fabricated, it leaves the platform 14 in an aft direction. The pipe directing means include a deck radius controller 13 connected to the aft end of the platform 14 and comprising a roller track or chute to direct the pipe to the radius controller 17.

The construction of the pipe laying zone 12 is as described above with reference to FIGS. 1 and 2. Again, the ramp radius controller 17 limits the plastic bending applied to the pipeline and a reverse plastic bending is applied by the straightener 18.

Referring next to FIGS. 7 to 11, parts common to the modified arrangement of the second form of pipe-laying system shown in these Figures and to the system shown in FIGS. 5 and 6 will be given the same reference numerals and will not be described in detail.

In this modification, the platform carries two pipe storage areas 25 towards the bow of the ship. These are spaced on opposite sides of the centre line of the ship. Four welding stations 26 are provided at spaced intervals along the centre line of the ship starting between the pipe storage areas 25 and extending towards the stern of the ship. These stations may be manual welding stations or be replaced by a single automated welding station. Two X-ray/repair stations 27 are provided between the last welding station 26 and the radius controller 17. The sternmost X-ray/repair station 27 also acts as a coating station and is connected to a coating container 28 for applying a coating to the pipeline 15.

A tensioner 29 is provided between the X-ray/repair stations 27 to control the tension in the fabricated pipeline 15.

The deck radius controller 17 comprises a segment of a cylinder having a curved outer surface. The segment is carried with its axis horizontal and normal to the length of the ship. The curved surface faces downwardly and the segment is pivoted about a horizontal transverse pivot 31 near the mid-point of the segment.

The deck also carries a piggy-back reel 32 which, as seen in FIG. 8, is mounted for rotation about a horizontal axis slightly skewed relative to a line normal to the length of the ship. The reel 32 carries a pipe 35 of small diameter (say, about 50–170 mm) which is to be laid on the back of the pipeline 15 in a manner to be described below. The reel 32 is associated with a second deck radius controller 33 which is similar to the deck pipe directing device 13 described above with reference to FIG. 1 but has a smaller diameter and a smaller arc length and is spaced closer to the stern of the ship than the device 13. This is best seen in FIG. 7. Two guides 34 are provided between the reel 32 and the second radius controller 33 for guiding the small diameter pipe 35 as it comes off the reel 32 and passes to the radius controller 33.

The pipe-laying zone 12 will now be described in more detail with particular reference to FIGS. 9, 10 and 11. While this pipe-laying zone 12 is described with specific reference to the arrangement of FIGS. 7 and 8, it will be appreciated that it can also be used with the arrangement of FIGS. 3 and 4.

Referring to these Figures, the ramp 16 carries a ramp radius controller 17 in the form of an arcuate track 36 lying in a vertical plane including the longitudinal axis of the ship and supported by a plurality of radial supports 37. As best seen in FIG. 8, the track 36 carries a plurality of rollers 38 which have horizontal axes parallel to the axis of the track 36. The rollers 38 are connected in a chain 39 which can move relative to the track 36 in a closed path including a portion around the track 36 and a portion between the ends of the track 36 (see FIG. 10). The ends of the track 36 are provided with curved guide surfaces 40 to guide the chain 39 on to and from the track 36.

Figure 10:
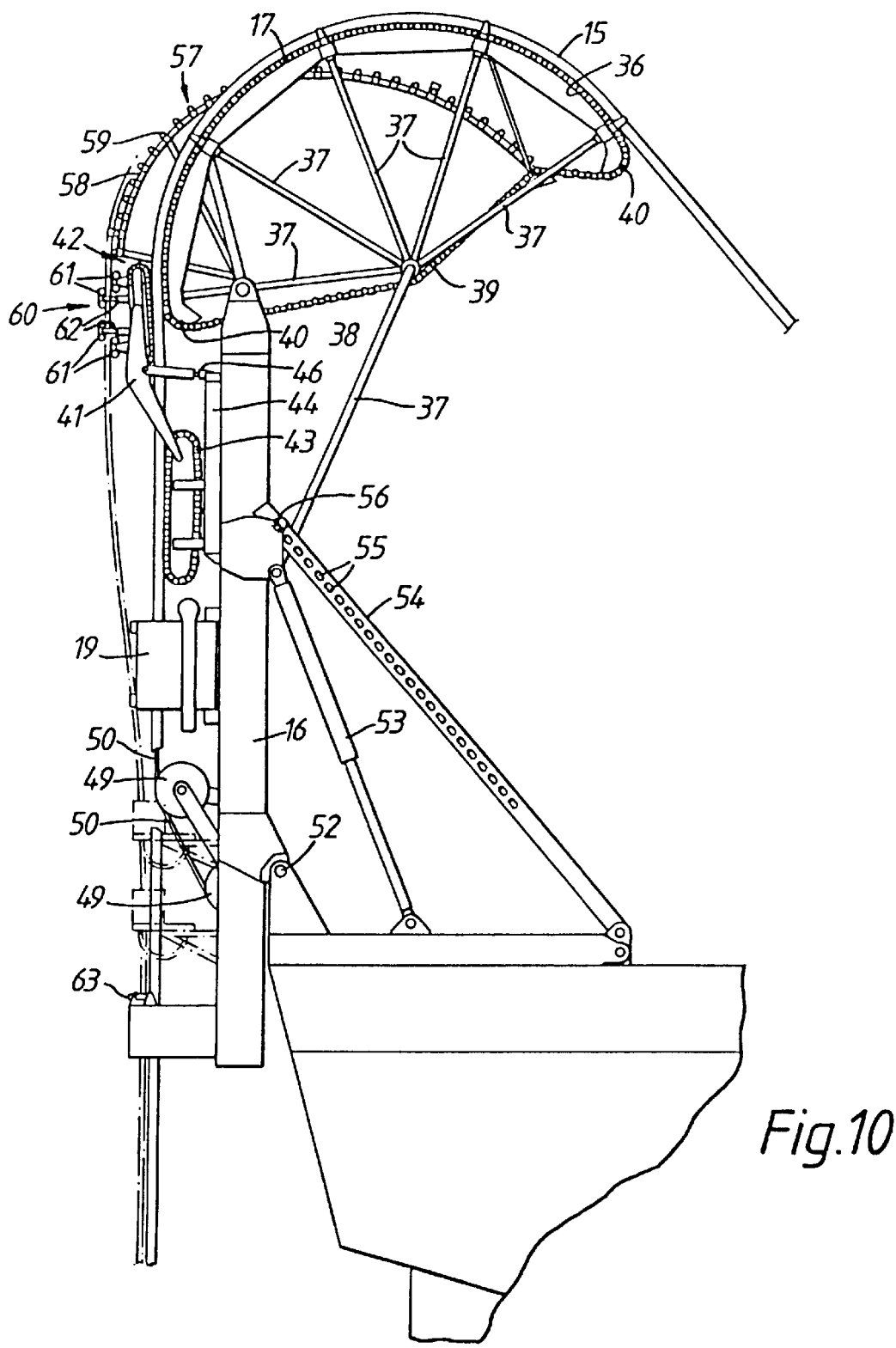
FIG. 10 is a side elevation of the stern of the ship of FIGS. 7 to 9 showing a ramp of the modified arrangement of the second form of pipe laying system.

The straightener 18 is best seen in FIG. 10. It comprises a pair of support arms 41 lying in respective vertical planes on opposite sides of the ramp 16. The support arms are in horizontal register. The upper ends of the arms carry a roller loop 42. This is shown in more detail in FIG. 11. Referring to this Figure, the roller loop 42 comprises two spaced sets of rollers 42a travelling in parallel but spaced oval paths. V-shaped pipe-engaging pads 42b are connected between the roller sets 42a. The pads 42b co-operate with the roller chain 39 at the downstream end of the track 36 (see FIG. 11) to form a nip through which the pipeline 15 passes.

The lower ends of the support arms 41 are connected to a second roller loop 43 carried on a support 44. The second roller loop 43 engages the pipeline on the opposite side of the pipeline at the point of engagement of the first roller loop 42 with the pipeline 15. An upper end of the support 44 is connected to the support arms 41 intermediate their ends by a pair of hydraulic pistons, one of which is shown at 46. Thus, by operation of the pistons 46, position of the roller loop 42 that co-operates with the roller chain 39 can be adjusted.

The tensioner 19 follows the second roller loop 43 and may, for example, be a 75 tonne tensioner. The tensioner 17 is of known kind.

As seen in FIG. 8, the tensioner 17 is followed by a shelter 47 carried on the ramp 16 and providing work platforms 48 for access to the pipeline 15.

Within the shelter 47 is a system of pulleys 49 for guiding a wire 50 from an abandonment/recovery winch 51 mounted on the deck 10 between the ramp 16 and the radius controller 13. The wire is used principally when fabrication of the pipeline 15 commences and when fabrication of the pipeline 15 is complete.

When fabrication of the pipeline 15 commences, the wire 50 is led from the winch 51 around the pulleys 49 through the tensioner 19, through the pipe straightener 15, around the radius controller 17, around the radius controller 13 and through the tensioner 29. It is then attached to the initial end of the pipeline 15 and as the pipeline 15 is fabricated at the welding stations 26, the winch 51 is used to draw the pipeline 15 through the tensioner 29, around the radius controller 13, around the radius controller 17, through the straightener 18, through the tensioner 19 to the fixed clamp 20. Once the pipeline 15 has been gripped by the tensioner 19, the wire 50 can be released from the end of the pipeline.

When the pipeline 15 is completed, the wire 50 is attached to the end of the pipeline 15 and the path of the wire 50 around the pulleys re-arranged so that the winch 51 can be used to lower the end of the pipeline 15 to the sea bed.

The clamp 20 is of conventional kind and can be used to grip the pipeline 15 to hold the pipeline stationary.

As seen in FIG. 10, the ramp 16 is mounted on a horizontal transverse pivot 52 on the deck. A pair of hydraulic rams, one of which is shown at 53, are connected between a point on the ramp 16 intermediate its ends and a point on the deck 10 spaced from the ramp 16. The rams 53 are used to adjust the position of the ramp 16 between the vertical position shown in FIGS. 9 and 10 and the inclined position shown in broken line in FIG. 9. The precise angle of the ramp 16 is determined by the depth at which the pipeline 15 is being laid and the characteristics of the pipeline. The deeper the pipeline is being laid, the more towards the vertical the ramp is inclined. When the position of the ramp 16 has been selected, it is locked in this position by use of a pair of stays, one of which is shown at 54 in FIG. 10. Each stay has one end pivotally mounted to the deck 10 and the other end connected to the ramp 16 at a point adjacent the point of connection between the rams 53 and the ramp 16. As seen in FIG. 10, each stay is provided with a plurality of spaced holes which are engageable by hydraulic pins 56 to fix the position of the ramp 16.

The ramp 16 also carries a radius controller 57 for the piggy-back pipe 35. This comprises an arcuate member 58 carrying a plurality of spaced rollers 59 which engage the piggy-back pipe 35 to guide it round the radius controller 57.

A straightener 60 is carried at the downstream end of the radius controller 57 for straightening the piggy-back pipe 35. The straightener 60 comprises four pairs of bogied rollers 61; two to one side of the pipe 35 and two to the other side of the pipe. The pairs of rollers one side of the pipe (the outer side relative to the ramp 16) are mounted on hydraulic rams 62 to allow the degree of reverse curvature applied to the piggy-back pipe 35 to be varied as required.

The mounting of the piggy-back pipe 35 on the pipeline 15 will be described below.

A stern roller box 63 is provided to guide the piggy-back pipe and the pipeline 15 as they leave the ramp 16.

This system operates as follows.

Lengths of pipe are taken from the pipe storage areas 25 by the cranes 24 and are laid on the platform 14. The abutting ends of the pipes are then welded to form the pipeline 15 at the welding stations 26. As described above, the wire 50 is attached to the leading end of the pipeline and the pipeline pulled from the welding stations 26 so that further lengths of pipe can be attached to the pipeline 15.

From the welding stations 26, the pipeline 15 is drawn by the wire through the X-ray/repair stations 27 where the welds are X-rayed and, if necessary, repaired. In addition, the pipeline 15 is coated from the coating container 28 at the downstream X-ray/repair station 27. The tensioner 29 between the stations 27 grips the pipeline 15 to hold the pipeline 15.

The pipeline 15 is then drawn by the wire 50 round the deck radius controller 13 whose radius is such that the pipeline 15 is bent plastically and is not over-bent. Variations in the bending stiffness of different pipelines 15 are accommodated by pivoting of the radius controller 13 such that no hogging or sagging of the pipeline 15 occurs within the coating or X-ray apparatus. The pipeline 15 then passes to the ramp radius controller 17 where it engages the roller chain 39 which guides the pipeline 15 around the radius controller 17 which again ensures that the pipeline 15 is bent only plastically.

The pipeline 15 then passes to the straightener 18 which applies a reverse curvature to the pipeline 15 to counteract the curvature applied by the controller 17 and straighten the pipeline 15. The reverse curvature is adjusted by use of the rams 46.

The angle of the ramp 16 is adjusted prior to fabrication of the pipeline using the rams 53 and the stays 54 to suit the depth at which the pipe line 15 is to be laid.

The pipeline 15 then passes through the tensioner 19 after which the wire 50 is removed at the workstation 48.

The pipeline 15 then passes through the fixed clamp 20 and on to the sea bed. The fabrication of the pipeline 15 then continues with the pipeline movement being controlled by the tensioners 19, 29.

At the same time, the piggy-back pipe 35 is fed from the reel 32 across the guides 34 to the associated radius controller 33 from which it passes to the piggy-back pipe radius controller 57 after which it is straightened by the straightener 60 before passing to the work platform 48. These controllers 33, 57 ensure that the pipe 35 is bent plastically without inducing excessive ovalisation or buckling. The degree of reverse curvature applied by the straightener is controlled by the associated rams 62.

At the work platform 48, rubber blocks (not shown) are strapped around the pipeline 15 and the piggy-back pipe 35 so connecting these together. The blocks also serve to space the piggy-back pipe 35 from the pipeline by a distance which may be 50 mm.

The piggy-back pipe 35 passes with the pipeline 15 through the clamp 19 to the sea bed.

When the pipeline 15 is complete, the wire 50 is attached to the end of the pipeline 15 and is used to feed the end of the pipeline 15 to the sea bed as described above.

In all the embodiments described above with reference to the drawings, the pipeline 15 is fabricated continuously on board the ship which can be replenished with lengths of pipe during laying so that the length of pipeline that can be laid during one trip is effectively unlimited. In addition, plastic bending is employed to allow the key ramp 16 to be adjusted to utilize the steepest catenary that the pipeline can safely withstand while maintaining the fabrication zone horizontal on the deck of the vessel. The thrust required to be produced by the vessel to maintain the pipeline's catenary is minimal even at great depths, and the required length of the vessel is reduced.

I claim:

1. A pipeline laying vessel for laying a continuous pipeline on a seabed, the vessel including:
    a deck,
    a store adjacent said deck for lengths of the pipe,
    means on said deck for connecting lengths of pipe to form a continuous pipeline,
    a ramp pivotally connected adjacent to said deck and rotatable about a horizontal axis normal to a direction of pipeline laying, said ramp having an upper end spaced above said deck, and a lower end spaced from said upper end,
    a pipeline directing means arranged to receive the continuous pipeline from said pipeline connecting means, said pipeline directing means plastically bending the continuous pipeline and directing the continuous pipeline to said upper end of said ramp,
    a pipeline straightener on said ramp arranged to receive the continuous pipeline from said pipeline directing means and to remove the bend imparted by said pipeline directing means, and
    means on the ramp arranged to receive the continuous pipeline from the pipeline straightener to hold the weight of the continuous pipeline as it extends below the vessel to the seabed during the laying, and to control the paying out of the pipeline.

2. A pipeline laying vessel according to claim 1 wherein, the pipeline directing means has a curved shape to reverse the direction of travel of the pipeline as it is paved out from the vessel.

3. A pipeline laying vessel according to claim 1 wherein the pipeline directing means is disposed on the vessel between the pipeline connecting means and the ramp so that during said paying out of the pipeline the pipeline will move relative to the vessel in the same direction both between the pipeline connecting means and the pipeline directing means and between the pipeline directing means and the ramp.

4. A pipeline laying vessel according to claim 1 wherein the pipeline directing means comprises a first radius controller adjacent an end of the pipeline connecting means and a second radius controller attached to the upper end of the ramp, the pipeline straightener being mounted adjacent the upper end of the ramp, the pipeline passing during said paying out from the first radius controller to the second radius controller and thence to the pipeline straightener.

5. A pipeline laying vessel according to claim 4 wherein each radius controller comprises a respective arcuate surface contacted by the pipeline, the first radius controller being mounted for pivotal movement about a horizontal axis.

6. A pipeline laying vessel according to claim 5 wherein each said arcuate surface carries an endless roller chain that contacts the pipeline as the pipeline passes round the associated radius controller, the roller chain travelling in a closed path round the arcuate surface in a vertical plane.

7. A pipeline laying vessel according to claim 4 wherein the pipeline straightener comprises three endless roller chains each travelling in a closed path in a vertical plane, said roller chains being disposed along the axis of the pipeline such that two outer roller chains support the pipeline adjacent the ramp while the third track, which is placed between the two outer tracks on the opposite side of the pipeline to the ramp, is adjustable so as to plastically bend the pipeline in a reverse sense to the curvature imparted by the second radius controller.

8. A pipeline laying vessel according to claim 7 wherein the straightener is arranged to co-operate with the second radius controller to reverse plastically bend the pipeline.

9. A pipeline laying vessel according to claim 1 wherein said receiving means on the ramp include a pipeline tensioning means for receiving pipe from the straightener, for carrying the weight of the pipeline between the vessel and the seabed as it is being laid, and for paying out the pipeline under control.

10. A pipelaying vessel according to claim 9 wherein the tensioning means comprises at least two closed loop tracks radially disposed in relation to the pipeline and with their planes passing through the axis of the pipeline.

11. A pipeline laying vessel according to claim 1 wherein said clamp is positioned at the lower end of the ramp downstream, in the direction of pipeline laying, of said tensioning means.

12. A pipeline laying vessel according to claim 8 wherein the tensioning means comprises a plurality of movable clamps disposed on the ramp for receiving pipeline from said straightener, the clamps working in synchrony to hold the weight of the pipeline and to pay the pipeline out under control.

13. A pipeline laying vessel according to claim 10 wherein the tensioning means comprises a plurality of movable clamps disposed on the ramp for receiving pipeline from said straightener, the clamps being arranged to work in synchrony to hold the weight of the pipeline and to pay the pipeline out under control, said holding clamp being formed by one of the clamps of the tensioning means.

14. A pipeline laying vessel according to claim 1 and further comprising means for drawing an initial end of the pipeline through the pipeline connecting means, the pipeline directing means, the pipeline straightener and the receiving means.

15. A pipeline laying vessel according to claim 13 wherein the drawing means comprises a winch and wire, the winch being connectable in use at one end to an initial end of the pipeline and at the other end to said winch.

16. A pipeline laying vessel according to claim 1 wherein said ramp is tiltable between a generally vertical position and a position close to the horizontal.

17. A pipeline laying vessel according to claim 16 wherein at least one hydraulic ram is connected to the ramp for adjusting the tilt of the ramp.

18. A pipeline laying vessel according to claim 17 wherein a stay is provided for locking the ramp at the required tilt.

19. A method of laying a pipeline from a vessel into the sea comprising the steps of: storing lengths of pipe on the vessel, fabricating a pipeline from said lengths of pipe on a generally horizontal deck of the vessel, guiding the fabricated pipeline in an arcuate upward path from said deck in which the pipeline is bent plastically, further bending the pipeline to align the pipeline for preparation for entry into the surface of the sea, straightening the pipeline, securing the pipeline after said straightening step to control the paying out of the pipeline, and deploying the pipeline from the vessel into the sea.

20. A method according to claim 19 further including the step of deploying the pipeline at a predetermined angle variable between vertical and an angle close to the horizontal.

21. A pipeline laying vessel according to claim 1 wherein the pipeline connecting means is disposed on the vessel between the pipeline directing means and the ramp.

22. A pipeline laying vessel according to claim 1 further including:

a clamp for holding the weight of the pipeline while work is done upon the pipeline.

23. A pipeline laying vessel as claimed in claim 4, wherein said connecting means comprises a plurality of processing stations spaced apart along the deck.

24. A method according to claim 19 wherein said fabrication step is performed at plural welding stations spaced along said deck.

25. A pipeline laying vessel for laying a continuous pipeline on a seabed, the vessel including:

a deck, a store adjacent said deck for lengths of pipe, means on said deck for connecting lengths of pipe by a sequence of operations to form a continuous pipeline, said connecting means comprising a plurality of processing stations spaced apart along the deck, a ramp pivotally connected adjacent to said deck and rotatable about a horizontal axis normal to a direction of pipeline laying, said ramp having an upper end spaced above said deck, and a lower end spaced from said upper end, a pipeline directing means arranged to receive the continuous pipeline from said pipeline connecting means, said pipeline directing means plastically bending the continuous pipeline so as to direct the continuous pipeline to said upper end of said ramp, a pipeline straightener on said ramp arranged to receive the continuous pipeline from said pipeline directing means and to remove the bend imparted by said pipeline directing means, and means on the ramp arranged to receive the continuous pipeline from the pipeline straightener to hold the weight of the continuous pipeline as it extends below the vessel to the seabed during laying, and to control the paying out of the pipeline.

26. A pipeline laying vessel as claimed in claim 25 wherein said processing stations comprise at least one welding station and an X-ray station following said at least one welding station.

27. A pipeline laying vessel as claimed in claim 25 wherein said processing stations include a plurality of welding stations.

28. A pipeline laying vessel as claimed in claim 25 further including:

a clamp for holding the weight of the pipeline while work is done upon on the pipeline.

* * * * *